(12) United States Patent
Kobayashi et al.

(10) Patent No.: US 9,879,777 B2
(45) Date of Patent: Jan. 30, 2018

(54) SHOCK ABSORBER AND PISTON (71) Applicant: KAYABA INDUSTRY CO., LTD., Tokyo (JP)

(72) Inventors: Yukimasa Kobayashi, Gifu (JP); Hideki Yamada, Gifu (JP); Yuta Hoshino, Gifu (JP)

(73) Assignee: KYB Corporation, Tokyo (JP)

( * ) Notice: Subject to any disclaimer, the term of this patent is extended or adjusted under 35 U.S.C. 154(b) by 362 days.

(21) Appl. No.: 14/422,731

(22) PCT Filed: Nov. 13, 2013

(86) PCT No.: PCT/JP2013/080639
§ 371 (c)(1),
(2) Date: Feb. 20, 2015

(87) PCT Pub. No.: WO2014/077265
PCT Pub. Date: May 22, 2014

(65) Prior Publication Data
US 2015/0211634 A1 Jul. 30, 2015

(30) Foreign Application Priority Data
Nov. 16, 2012 (JP) .................. 2012-251720

(51) Int. Cl.
*F16F 9/32* (2006.01)
*F16J 1/04* (2006.01)

(52) U.S. Cl.
CPC .............. *F16J 1/04* (2013.01); *F16F 9/3214* (2013.01)

(58) Field of Classification Search
CPC .. F16J 1/04; F16J 9/3214; B60G 17/08; F16F 9/5126
See application file for complete search history.

(56) References Cited

U.S. PATENT DOCUMENTS 6,886,670 B2 * 5/2005 Holiviers .............. F16F 9/3214
188/322.14

FOREIGN PATENT DOCUMENTS

| JP | 58-125747 U | 8/1983 |
| JP | 61-099742 U | 6/1986 |
| JP | 08-177931 A | 7/1996 |
| JP | 2004-204863 A | 7/2004 |

* cited by examiner

Primary Examiner — Logan Kraft
Assistant Examiner — Abiy Teka
(74) Attorney, Agent, or Firm — Rabin & Berdo, P.C.

(57) ABSTRACT

A piston includes a disc formed to have an annular shape, a cylindrical skirt portion that projects from an outer peripheral portion of the disc on one end side in an axial direction of the disc, and a passage that is formed in the disc and that is opened on an inner side of the skirt portion. An inner peripheral surface of the skirt portion is a slope that increases its diameter toward a side opposite to the disc.

4 Claims, 8 Drawing Sheets

SHOCK ABSORBER AND PISTON

TECHNICAL FIELD

The present invention relates to a shock absorber and a piston.

BACKGROUND ART

Figure 8:
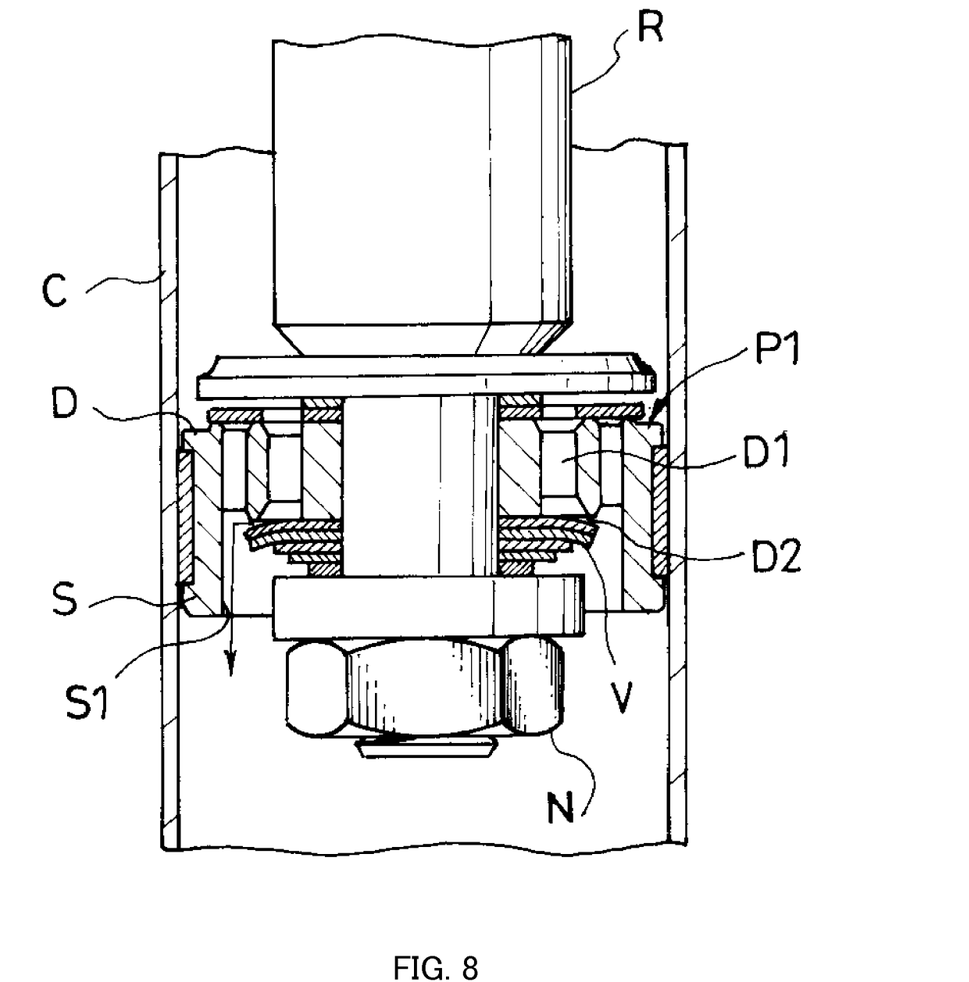
FIG. 8 is a front sectional view illustrating a part of a shock absorber on which a piston according to a comparative example is mounted.

JP2004-204863A discloses a piston structure of a shock absorber. As illustrated in FIG. 8, this piston P1 is provided with an annular disc D that is held by a piston rod R inserted into a cylinder C, and a cylindrical skirt portion S that projects in the axial direction from the outer periphery portion of the lower end of the disc D (downward direction in FIG. 8).

The length of the piston P1 in the axial direction is obtained by adding the length of the disc D and the length of the skirt portion S. This makes it possible to reduce contact pressure with respect to the inner periphery of the cylinder C, at the time when lateral force is applied to the piston P1, as compared with the case where the length is for the disc D only.

The piston P1 is provided with an annular valve V on the inner side of the skirt portion S. Thereby, projection length of a piston nut N that keeps the annular valve V in contact with the disc D can be reduced, and correspondingly, an effective stroke of the piston P1 inside the cylinder C can be increased.

SUMMARY OF INVENTION

When the shock absorber, equipped with the piston P1, extends, the annular valve V that is on the inner side of the skirt portion S bends at the end portion of the outer periphery, as it receives pressure of a working fluid that passes through an extending-side passage D1 formed in the disc D. This generates a gap between the annular valve V and a seat D2, and the working fluid flows out to the inner side of the skirt portion S via this gap. Therefore, the shock absorber exhibits damping function.

When the annular valve V opens as described above, the working fluid, passing through a space between the seat D2 and the annular valve V and flowing out to the inner side of the skirt portion S, flows out almost horizontally, and comes into collision with an inner peripheral surface S1 of the skirt portion S. As the inner peripheral surface S1 of the skirt portion S is formed straight along the axial direction of the skirt portion S, the flowed-out working fluid bends at right angles and flows into the cylinder C, as illustrated by an arrow in FIG. 8.

Thus, it is difficult for the working fluid, passing through the space between the seat D2 and the annular valve V and flowing to the cylinder C, to smoothly flow along the inner side of the skirt portion S. This may cause working sounds from the shock absorber.

It is an object of the present invention to provide a shock absorber and a piston that can improve a flow of the working fluid and that can prevent the generation of the working sounds of the shock absorber.

According to one aspect of the present invention, a shock absorber on which a piston is mounted is provided. The piston includes a disc that is formed to have an annular shape and that has a seat on an end surface; a cylindrical skirt portion that projects from an outer peripheral portion of the disc on a side opposite to the seat in an axial direction of the disc, that includes an annular end portion on an end portion on the side opposite to the disc, and that is a slope whose inner peripheral surface increases its diameter toward the side opposite to the disc; and a passage that is formed in the disc, that is opened on an inner side of the skirt portion, that is openably closed by an annular valve stacked on an end surface of the disc on a side of the skirt portion, and that is opened when the annular valve bends. An inner diameter of the annular end portion is greater than an outer diameter of the seat. An angle between a horizontal plane that is orthogonal to an axis and an inner peripheral surface of the skirt portion is smaller than an angle between the horizontal plane and an outer peripheral surface of the seat.

DESCRIPTION OF EMBODIMENTS

Hereinafter, embodiments of the present invention are described with reference to the accompanying drawings.

First, a first embodiment will be explained.

Figure 1:
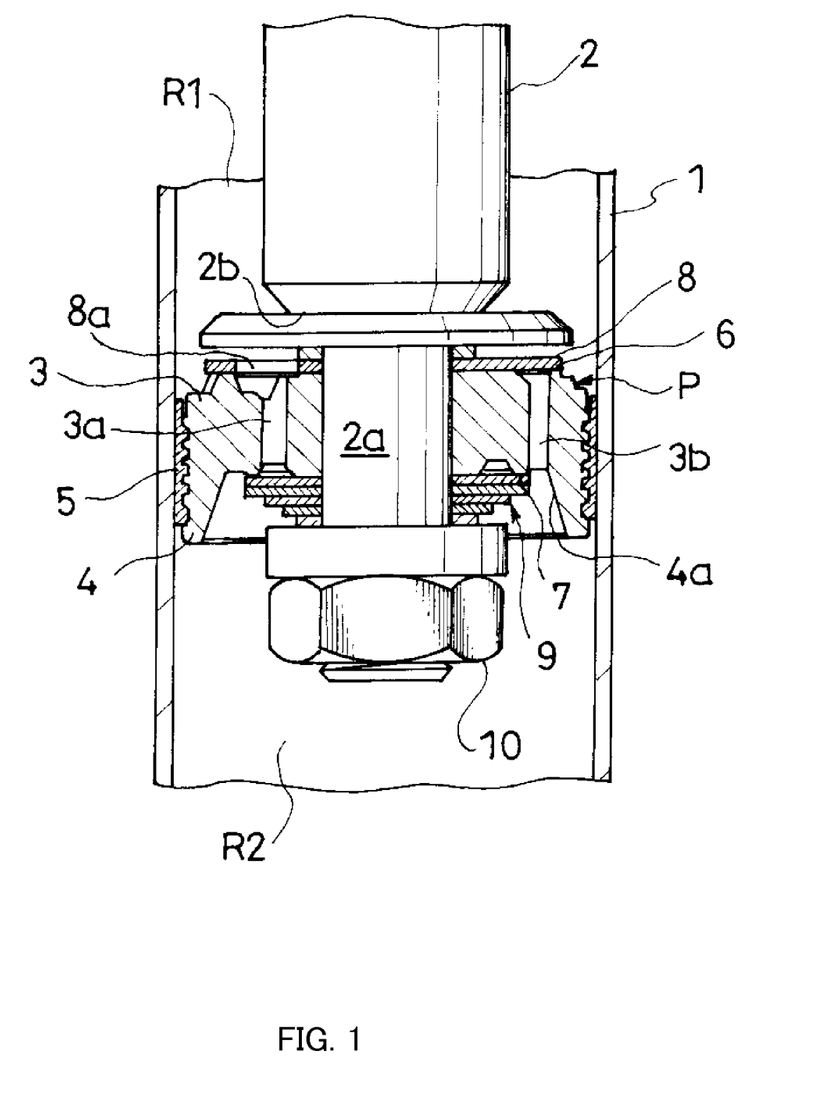
FIG. 1 is a front sectional view illustrating a part of a shock absorber on which a piston according to a first embodiment of the present invention is mounted.

FIG. 1 is a front sectional view illustrating a part of a shock absorber on which a piston P of this embodiment is mounted.

The piston P is inserted into a cylinder 1, and divides the cylinder 1 into one chamber R1 and another chamber R2. The piston P is held by a tip end portion 2a of a piston rod 2 that is inserted into the cylinder 1, and slides inside the cylinder 1 as the piston rod 2 enters into and exits from the cylinder 1.

The piston P is provided with an annular disc 3 that is inserted into the cylinder 1, and a cylindrical skirt portion 4 that projects from the outer peripheral portion on one end side of the disc 3 toward the lower side of the disc 3 in the axial direction (downward in FIG. 1).

The piston P is further provided with extending-side passages 3a that are formed in the disc 3 on the inner side of the skirt portion 4. An inner peripheral surface 4a of the skirt portion 4 is a slope that increases its diameter toward the direction opposite to the disc, that is, toward the downward direction in FIG. 1. The piston P is further provided with pressing-side ports 3b that are in parallel with the extending-side passages 3a.

Figure 3:
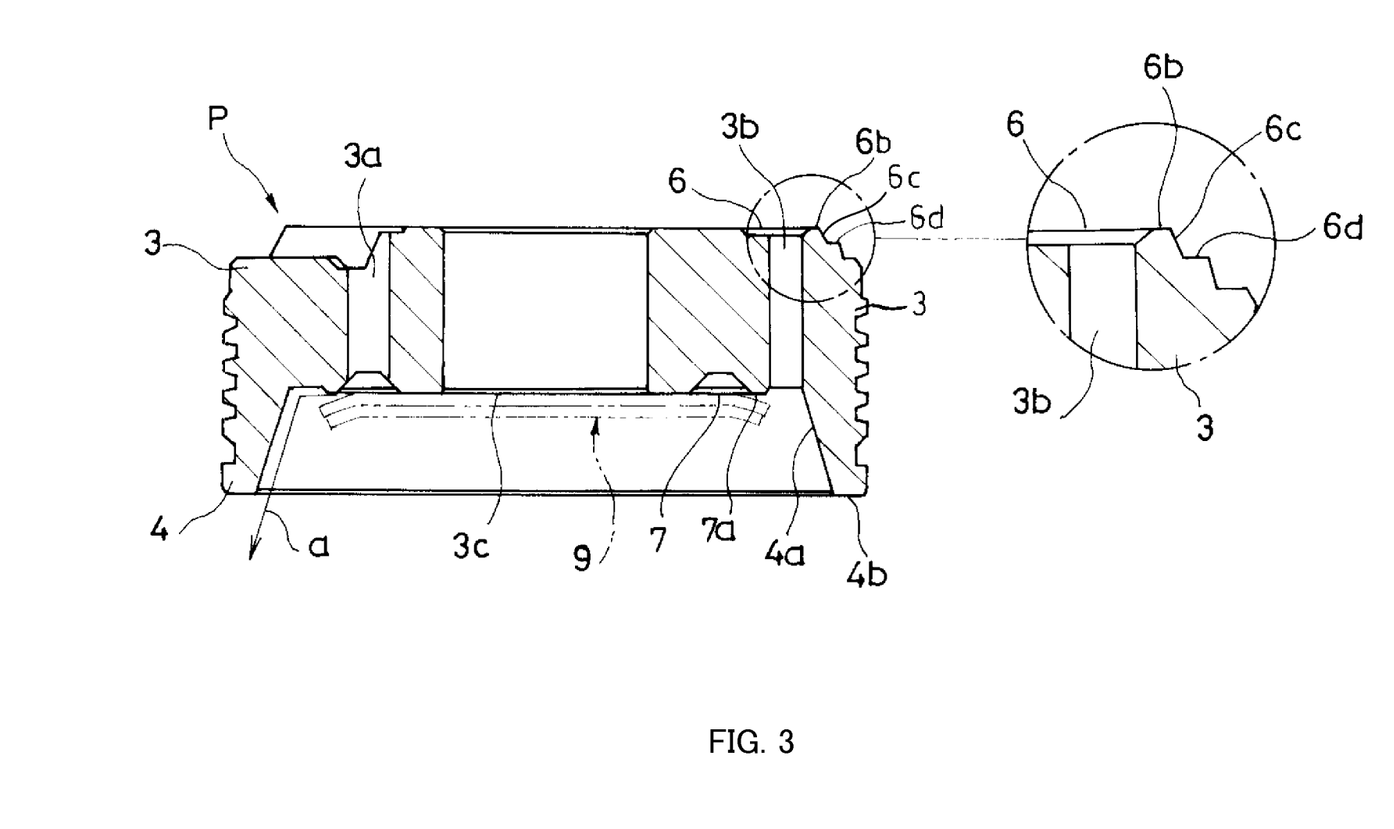
FIG. 3 is a sectional view taken along the III-III line in FIG. 2.

The disc 3 and the skirt portion 4 are integrally formed by sintering or the like. As illustrated in FIG. 3, the lower end portion of the skirt portion 4 is an annular end portion 4b that is in parallel with an end surface as the lower end of the disc 3 on the side of the skirt portion, that is, an end surface 3c that opposes to the another chamber R2 (FIG. 1).

As illustrated in FIG. 1, the length of the piston P in the axial direction is obtained by adding the length of the disc 3 and the length of the skirt portion 4. This makes it possible to reduce contact pressure with respect to the inner periphery of the cylinder 1, at the time when lateral force is applied to the piston P, as compared with the case where the length is for the disc 3 only.

A piston ring 5 is fitted to the outer periphery of the piston P, from the outer periphery of the disc 3 to the outer periphery of the skirt portion 4. The piston ring 5 is in sliding contact with the inner periphery of the cylinder 1, so as to secure a sliding property of the piston P with respect to the cylinder 1.

It should be noted that the piston ring 5, formed in an annular shape in advance, is fitted to the outer periphery of the skirt portion 4 of the piston P, heated in this state, deformed to be in a cylindrical shape, and fitted to the outer periphery of the skirt portion 4 and the disc 3.

The piston P has a seat 6 on the end surface of the disc 3 on the side opposite to the skirt portion (upper end surface in FIG. 1 and FIG. 3), that is, on the end surface opposing to the one chamber R1. The seat 6 surrounds the ends on the downstream side of the pressing-side ports 3b that are formed in the piston P and are opened in the end surface of the disc 3 on the side opposite to the skirt portion and on the inner side of the skirt portion 4.

As illustrated in FIG. 3, the piston P has a seat 7 on the end surface 3c of the disc 3 on the side of the skirt portion. The seat 7 surrounds the ends on the downstream side of the extending-side passages 3a that are formed in the piston P and are opened in the end surface 3c of the disc 3 on the side of the skirt portion and on the inner side of the skirt portion 4. The seat 7 has an annular groove (not illustrated) that is opened inwardly from the ends of the extending-side passages 3a on the downstream side.

A check valve 8 that openably closes the ends of the pressing-side ports 3b on the downstream side is seated on the seat 6. An extending-side valve 9, as an annular valve, that openably closes the ends of the extending-side passages 3a on the downstream side is seated on the seat 7. The check valve 8 has an opening 8a that communicates with the ends of the extending-side passage 3a on the upstream side, thus permitting an inflow of a working fluid in the one chamber R1 into the extending-side passages 3a.

The end portion of the outer periphery of the check valve 8 bends to form a gap between itself and the seat 6, through which the working fluid passes. The end portion of the outer periphery of the extending-side valve 9 bends to form a gap between itself and the seat 7, through which the working fluid passes. The check valve 8 and the extending-side valve 9 apply resistance to a flow of the working fluid passing through the gaps, and exhibit predetermined damping function.

The check valve 8 is formed by one annular leaf valve, and the extending-side valve 9 is formed by a plurality of annular leaf valves that are laminated one another. The check valve 8 and the extending-side valve 9, sandwiching the piston P vertically, are held between a step portion 2b of the piston rod 2 and a piston nut 10.

The inner peripheral surface 4a of the skirt portion 4 is the slope that increases its diameter toward the direction opposite to the disc (downward direction in FIG. 1 and FIG. 3). This allows the working fluid in the one chamber R1 to pass through the extending-side passages 3a and through the space between the seat 7 and the extending-side valve 9 by bending the extending-side valve 9, at the time of extending-side operation of the shock absorber in which the piston P rises inside the cylinder 1. The working fluid, passing through the space between the seat 7 and the extending-side valve 9, comes into collision with the inner peripheral surface 4a of the skirt portion 4, and flows downward to the side of the another chamber R2 along the slope of the inner peripheral surface 4a of the skirt portion 4, as illustrated by an arrow a in FIG. 3.

According to the piston P of this embodiment, the flow of the working fluid can be smoothed since the working fluid, flowing out to the inner side of the skirt portion, does not bend at right angles to flow inside the cylinder, that is the case of the piston P1 as illustrated in FIG. 8, in which the inner peripheral surface is formed straight along the axial direction of the skirt portion.

Thus, the smooth flow of the working fluid can suppress the generation of working sounds at the time of the extending-side operation of the shock absorber in which the piston P rises inside the cylinder 1.

In addition, the smooth flow of the working fluid in the piston P allows the shock absorber having the piston P to generate the damping force according to the setting with respect to a wider range of frequency and a piston speed so as to improve comfortability of the ride of the vehicle further.

Figure 2:
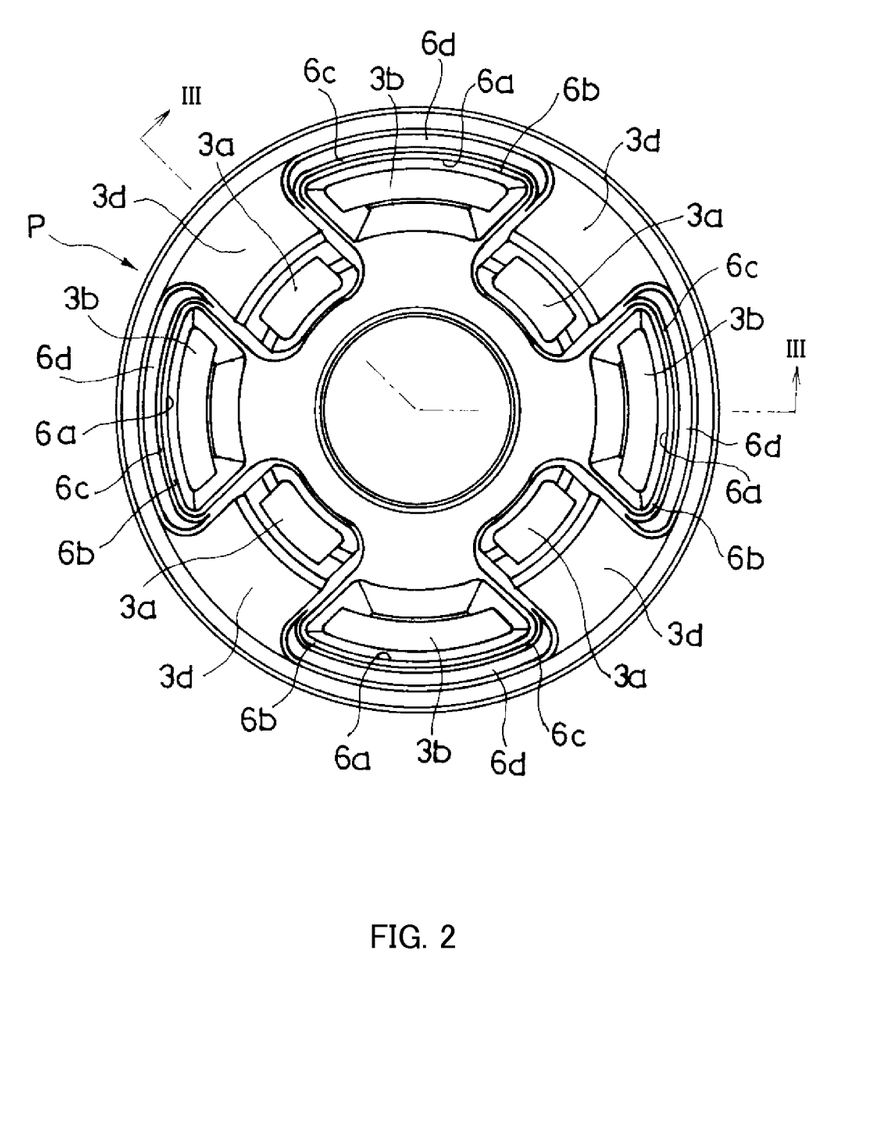
FIG. 2 is a plan view illustrating the piston according to the first embodiment of the present invention.

As illustrated in FIG. 2, the seat 6 which is formed on the end surface opposing to the one chamber R1 has opening windows 6a that are independently arranged with spaces therebetween in the circumferential direction. The ends of the pressing-side ports 3b on the downstream side are opened in the bottom portions of the opening windows 6a. Between the opening windows 6a that are adjacent to each other in the circumferential direction, recessed portions 3d, each being formed to be lower than a seat surface 6b, and having the end of the extending-side passage 3a on the upstream side being opened therein, are provided. Incidentally, FIG. 3 is a sectional view taken along the III-III line in FIG. 2.

Figure 4:
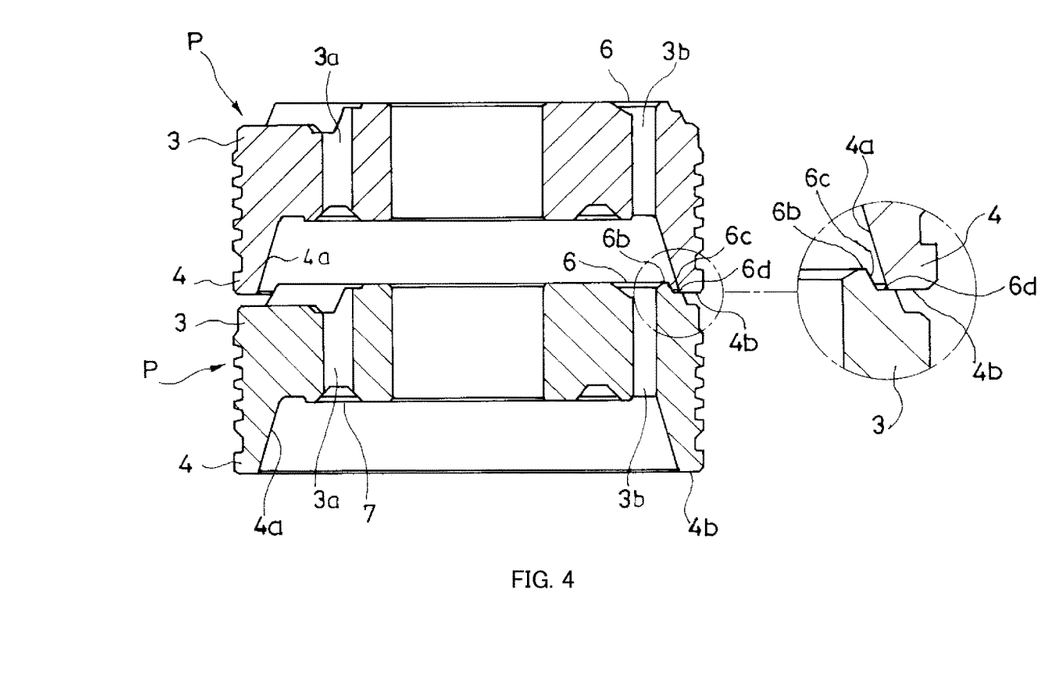
FIG. 4 is a sectional view illustrating a state in which the pistons according to the first embodiment of the present invention are stacked.

The seat 6 having the opening windows 6a has a step portion 6d on an outer peripheral surface 6c. When the piston P is put on top of the underside piston P in a concentric manner, as illustrated in FIG. 4, the annular end portion 4b of the skirt portion 4 of the upside piston P abuts against the step portion 6d of the underside piston P.

Figure 5:
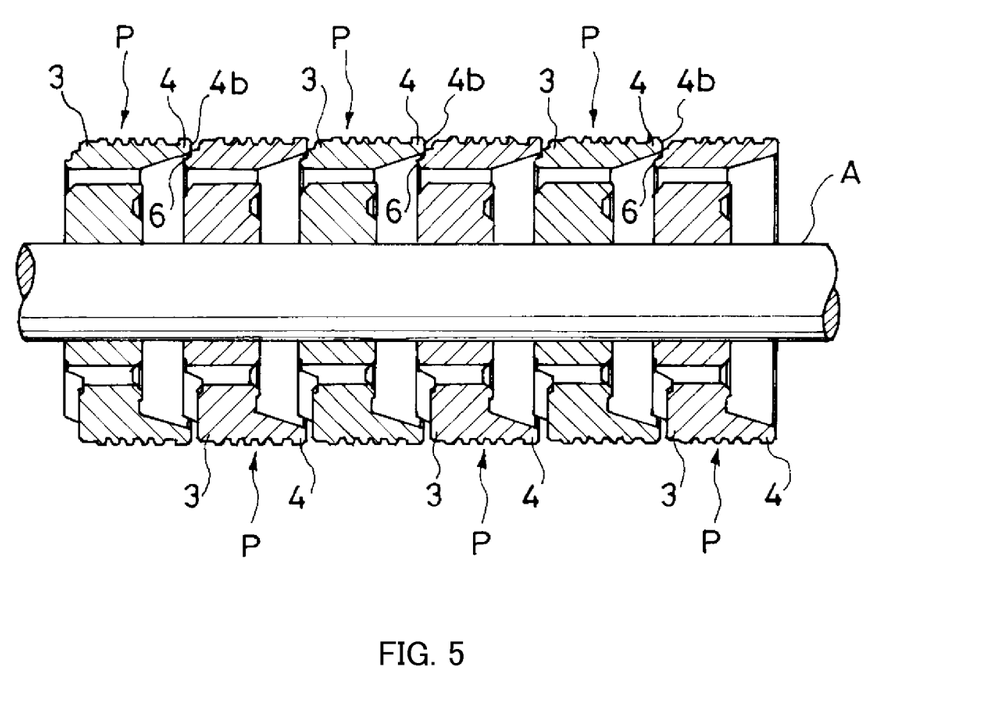
FIG. 5 is a sectional view illustrating a state in which a plurality of the pistons according to the first embodiment of the present invention are pierced and horizontally placed.

When the pistons P are stored or transported, a plurality of the pistons P are pierced in series by a shaft A, and are horizontally placed, as illustrated in FIG. 5.

According to the piston P1 of the comparative example, as illustrated in FIG. 8, the inner peripheral surface of the skirt portion S on the side of the disc D is formed straight. Therefore, when the pistons P1 are pierced in series as described above, the annular end surface 4b of the skirt portion 4 may be brought into contact with the seat surface 6b of the opposing seat 6.

When the plurality of the pierced pistons P1 rock in the right-and-left direction and move in the up-and-down direction, while the annular end surface 4b of each skirt portion 4 is in contact with the seat surface 6b of each seat 6, as described above, the annular end portion 4b of the skirt portion 4 is repeatedly seated onto and separated from the seat surface 6b of the seat 6. This may cause deformation of the seat surface 6b of the seat 6. Thus, disadvantages such as variations in damping characteristics in the shock absorber after assembly and the like may be caused.

Figure 6A:
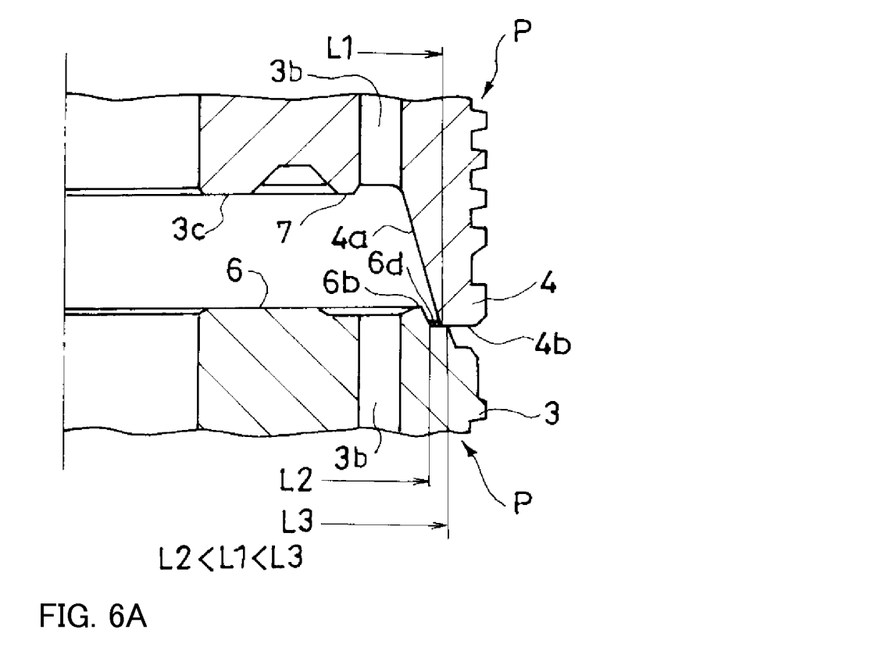
FIG. 6A is a sectional view partially illustrating a state in which the pistons according to the first embodiment of the present invention are stacked.

According to the piston P of this embodiment, as illustrated in FIG. 6A, an inner diameter L1 of the annular end portion 4b of the skirt portion 4 is set to be greater than an inner diameter L2 of the step portion 6d and is set to be smaller than an outer diameter L3 of the step portion 6d, so that the annular end portion 4b of the skirt portion 4 does not interfere with the opposing seat surface 6b of the seat 6.

Thereby, the annular end portion 4b of the skirt portion 4 can be seated on the step portion 6d of the seat 6, and a gap (not designated by a reference numeral) can be provided between the inner peripheral surface 4a of the skirt portion 4 and the outer peripheral surface 6c of the seat 6. This makes it possible to prevent the skirt portion 4 from interfering with the seat 6.

Figure 6B:
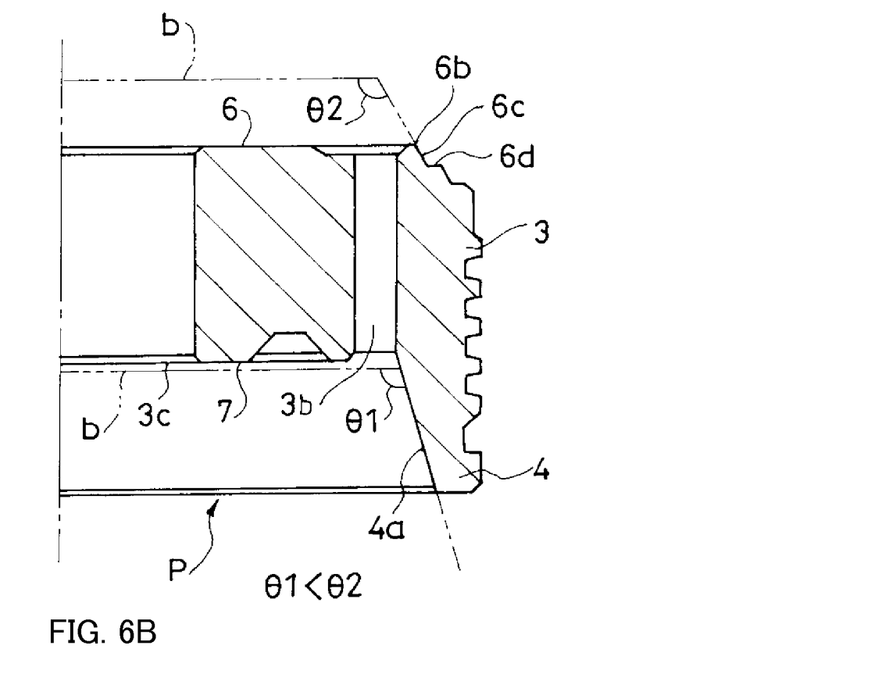
FIG. 6B is a sectional view partially illustrating a state in which the pistons according to the first embodiment of the present invention are stacked.

In addition, as illustrated in FIG. 6B, an angle θ1 between a horizontal plane b that is orthogonal to an axis of the piston P and the inner peripheral surface 4a of the skirt portion 4 is set to be smaller than an angle θ2 between the horizontal plane b and the outer peripheral surface 6c of the seat 6.

Thereby, it is possible to prevent the inner peripheral surface 4a of the skirt portion 4 from interfering with the seat surface 6b of the seat 6, and also to form the gap between the inner peripheral surface 4a of the skirt portion 4 and the outer peripheral surface 6c of the seat 6. This makes it possible to prevent the skirt portion 4 from interfering with the seat 6 more reliably.

In other words, in the case where the annular end portion 4b of the skirt portion 4 is seated on the step portion 6d of the seat 6, the interference of the inner peripheral surface 4a of the skirt portion 4 with the seat surface 6b of the seat 6 can be avoided without fail, when the condition of L2<L1<L3 is satisfied by the inner diameters L1 and L2 and the outer diameter L3, and when the condition of θ1<θ2 is satisfied by the angles θ1 and θ2. Thereby, the deformation of the seat surface 6b of the seat 6 due to the interference by the skirt portion 4 can be prevented without fail, at the time when the pierced pistons P are stored horizontally or transported, as illustrated in FIG. 5.

The following effects can be obtained by the embodiment as described thus far.

With the piston P, the inner peripheral surface 4a of the skirt portion 4 that projects from the disc 3 on its outer peripheral portion on one end is formed as the slope that increases its diameter toward the direction opposite to the disc. Thereby, when the pistons P are vertically stacked in the concentric manner, it is possible to avoid the interference of the annular end portion 4b of the skirt portion 4 of the upside piston P with the seat surface 6b of the seat 6 of the underside piston P, depending on the settings of the inner diameters L1 and L2 and the outer diameter L3, and the settings of the angles θ1 and θ2.

Further, as the annular end portion 4b of the skirt portion 4 of the upside piston P abuts against the step portion 6d formed on the outer peripheral surface 6c of the seat 6 of the underside piston P, the height position of the skirt portion 4 can be raised with respect to the seat 6. This makes it possible to increase the gap formed between the inner peripheral surface 4a of the skirt portion 4 and the outer peripheral surface 6c of the seat 6. Thus, the interference of the annular end portion 4b of the skirt portion 4 with the seat surface 6b of the seat 6 can be avoided more reliably.

Furthermore, the gap formed between the inner peripheral surface 4a of the skirt portion 4 and the outer peripheral surface 6c of the seat 6 is narrowed as much as possible. Thereby, the thickness of the skirt portion 4 can be increased correspondingly, and durability of the skirt portion 4 can be improved.

Further, when the pistons P are vertically stacked in the concentric manner, the seat 6 of the underside piston P is covered by the skirt portion 4 of the upside piston P. Thus, at the time when the plurality of the pistons P are stored or transported by being aligned and pierced by the shaft A, the seat surface 6b of each seat 6 is protected by the skirt portion 4.

Next, a second embodiment will be explained.

Figure 7A:
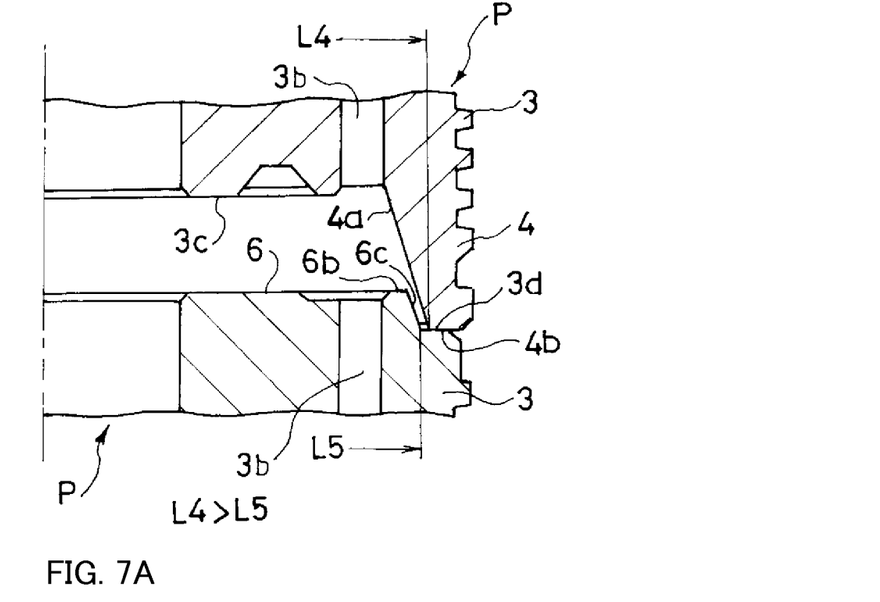
FIG. 7A is a sectional view partially illustrating a state in which the pistons according to a second embodiment of the present invention are stacked.

FIG. 7A is a sectional view partially illustrating the state where the pistons P according to this embodiment are stacked. In the following explanation, the points that are different from the first embodiment will be mainly explained.

The piston P of this embodiment does not have the step portion 6d (FIG. 4) on the outer peripheral surface 6c of the seat 6, contrary to the first embodiment. When the pistons P like this are stacked in the concentric manner, the annular end portion 4b of the skirt portion 4 abuts directly against the recessed portions 3d that are formed between the adjacent opening windows 6a, as illustrated in FIG. 7A.

As illustrated in FIG. 7A, an inner diameter L4 of the annular end portion 4b of the skirt portion 4 is set to be greater than the outer diameter of the seat 6, that is, the outer diameter of the seat surface 6b of the seat 6, and to be greater than an outer diameter L5 of the lower end portion of the outer peripheral surface 6c of the seat 6.

Thereby, it is possible to avoid the interference of the inner peripheral surface 4a of the skirt portion 4 with the seat surface 6b of the seat 6, and also to form the gap between the inner peripheral surface 4a of the skirt portion 4 and the outer peripheral surface 6c of the seat 6. This makes it possible to avoid the interference of the skirt portion 4 with the seat 6 more reliably.

Figure 7B:
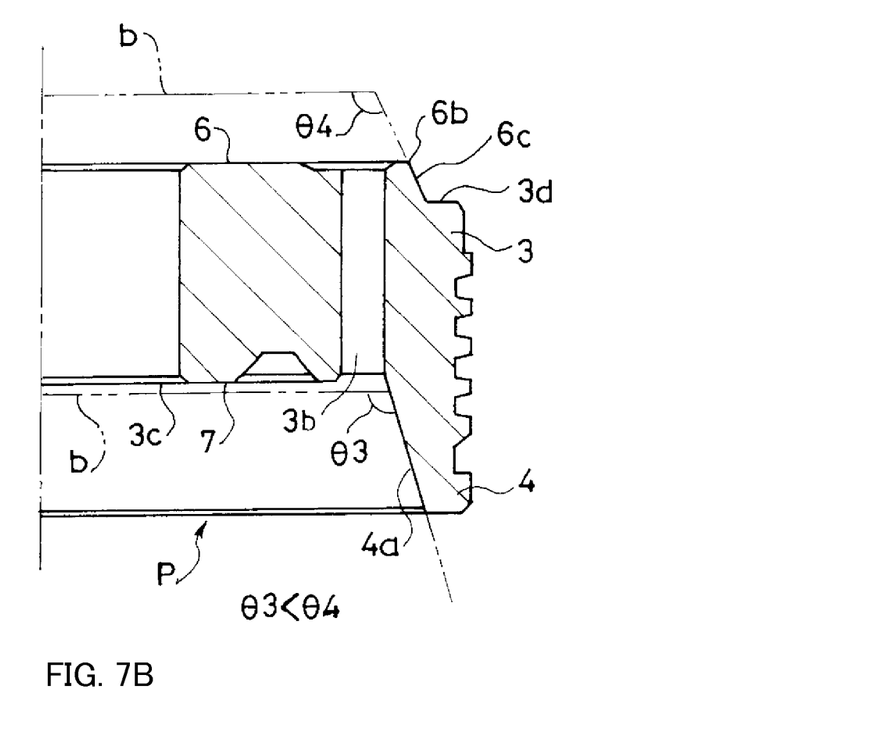
FIG. 7B is a sectional view partially illustrating a state in which the pistons according to the second embodiment of the present invention are stacked.

FIG. 7B is a sectional view illustrating angle conditions between the skirt portion 4 and the seat 6, similarly to FIG. 6B as described above. An angle θ3 between the horizontal plane b that is orthogonal to the axis of the piston P and the inner peripheral surface 4a of the skirt portion 4 is set to be smaller than an angle θ4 between the horizontal plane b and the outer peripheral surface 6c of the seat 6.

Thereby, it is possible to avoid the interference of the inner peripheral surface 4a of the skirt portion 4 with the seat surface 6b of the seat 6, and also to form the gap between the inner peripheral surface 4a of the skirt portion 4 and the outer peripheral surface 6c of the seat 6, and hence the skirt portion 4 does not interfere with the outer peripheral surface 6c of the seat 6. Thus, the interference of the skirt portion 4 with the seat 6 can be avoided more reliably.

The following effects can be obtained by the above-described embodiment.

With the piston P, the inner peripheral surface 4a of the skirt portion 4 that projects from the disc 3 on its outer peripheral portion on one end is formed as the slope that increases its diameter toward the direction opposite to the disc. Thereby, when the pistons P are vertically stacked in the concentric manner, it is possible to avoid the interference of the annular end portion 4b of the skirt portion 4 of the upside piston P with the seat surface 6b of the seat 6 of the underside piston P, depending on the settings of the inner diameter L4 and the outer diameter L5, and the settings of the angles θ3 and θ4.

Further, the gap between the inner peripheral surface 4a of the skirt portion 4 and the outer peripheral surface 6c of the seat 6 is narrowed as much as possible. Thereby, the thickness of the skirt portion 4 can be increased correspondingly, and the durability of the skirt portion 4 can be improved.

As the annular end portion 4b of the skirt portion 4 of the upside piston P abuts against the recessed portions 3d outside the seat 6 of the underside piston P, the total length of the plurality of the pistons P that are stacked concentrically can be reduced. This makes it possible to improve storage capacity at the time when the plurality of the pistons P are stored or transported by being aligned and pierced by the shaft A.

Further, when the pistons P are vertically stacked in the concentric manner, the seat 6 of the underside piston P is covered by the skirt portion 4 of the upside piston P. Thus, at the time when the plurality of the pistons P are stored or transported by being aligned and pierced by the shaft A, the seat surface 6b of the seat 6 is protected by the skirt portion 4.

The embodiments of the present invention described above are merely illustration of some application examples of the present invention and not of the nature to limit the technical scope of the present invention to the specific constructions of the above embodiments.

According to the above-described embodiments, the case of forming the piston P by the sintering has been explained as an example. However, die-cast molding or injection molding using a resin material may be employed instead.

Further, according to the above-described embodiment, the step portion 6d, formed on the outer peripheral surface 6c of the seat 6, is formed to have a circular arc shape along the outer peripheral surface 6c. However, the step portion may have a shaft shape that is provided partially on the outer peripheral surface 6c and that extends upward, or a box shape, for example, as long as the step portion is configured to allow the annular end portion 4b of the skirt portion 4 to be seated thereon.

Furthermore, according to the above-described embodiments, the case of employing the piston P in the shock absorber has been explained as an example. However, the piston P may be employed in a gas spring, a seat damper, and the like.

The present application claims a priority based on Japanese Patent Application No. 2012-251720 filed with the Japan Patent Office on Nov. 16, 2012, all the contents of which are hereby incorporated by reference.

The invention claimed is:

1. A shock absorber on which a piston is mounted, wherein the piston comprises:
a disc that is formed to have an annular shape around an axis and that has a seat on an end surface, the seat having a conical outer surface, a diameter of which decreases in a direction away from the disc along the axis;
a cylindrical skirt portion that projects from an outer peripheral portion of the disc on a side opposite to the seat along the axis, the skirt portion including an annular end portion formed on an end portion on the side opposite to the disc, an outer peripheral surface, and an inner peripheral surface of a conical shape, a diameter of which increases in a direction toward the side opposite to the disc along the axis; and
a passage that is formed in the disc that is opened on an inner side of the skirt portion, that is openably closed by an annular valve stacked on an end surface of the disc on a side of the skirt portion, and that is opened when the annular valve bends, wherein:
an inner diameter of the annular end portion is greater than an outer diameter of the seat; and
an angle between a horizontal plane that is orthogonal to the axis and an inner peripheral surface of the skirt portion is smaller than an angle between the horizontal plane and an outer peripheral surface of the seat in a state where the angles are measured as angles between ninety degrees and a hundred eighty degrees.

2. The shock absorber according to claim 1, wherein:
the seat includes a step portion that is in parallel with the horizontal plane on the conical outer surface; and
an inner diameter of the step portion is smaller than the inner diameter of the annular end portion, and an outer diameter of the step portion is greater than the inner diameter of the annular end portion.

3. The shock absorber according to claim 2, wherein:
the seat includes opening windows that are independently arranged with spaces therebetween in a circumferential direction; and
the step portion is provided on outer peripheral surfaces of the opening windows.

4. A piston, comprising:
a disc that is formed to have an annular shape around an axis and that has a seat on an end surface, the seat having a conical outer surface, a diameter of which decreases in a direction away from the disc along the axis;
a cylindrical skirt portion that projects from an outer peripheral portion of the disc on a side opposite to the seat along the axis, the skirt portion including an annular end portion formed on an end portion on the side opposite to the disc, an outer peripheral surface, and an inner peripheral surface of a conical shape a diameter of which increases in a direction toward the side opposite to the disc along the axis; and
a passage that is formed in the disc, that is opened on an inner side of the skirt portion, that is openably closed by an annular valve stacked on an end surface of the disc on a side of the skirt portion, and that is opened when the annular valve bends, wherein:
an inner diameter of the annular end portion is greater than an outer diameter of the seat; and
an angle between a horizontal plane that is orthogonal to the axis and an inner peripheral surface of the skirt portion is smaller than an angle between the horizontal plane and an outer peripheral surface of the seat in a state where the angles are measured as angles between ninety degrees and a hundred eighty degrees.

* * * * *